United States Patent [19]

Mattis et al.

[11] Patent Number: 5,279,157

[45] Date of Patent: Jan. 18, 1994

[54] LIQUID LEVEL MONITOR

[75] Inventors: Donald J. Mattis, Norwalk; Ali El-Haj, Trumbull; Lisa Toth, Huntington; Kenneth J. Kelemen, Fairfield, all of Conn.

[73] Assignee: Casco Products Corporation, Bridgeport, Conn.

[21] Appl. No.: 923,524

[22] Filed: Aug. 3, 1992

[51] Int. Cl.$^5$ .............................................. G01F 23/22
[52] U.S. Cl. .................................. 73/290 R; 250/557; 250/903
[58] Field of Search ................... 73/290; 250/577, 903; 356/135, 136, 137

[56] References Cited

U.S. PATENT DOCUMENTS

| | | |
|---|---|---|
| 1,883,971 | 10/1932 | Kryzanowsky . |
| 2,368,705 | 2/1945 | DuPont et al. ..................... 73/323 |
| 2,620,660 | 12/1952 | Goldsmith ......................... 73/293 |
| 2,686,428 | 8/1954 | Erikson ............................. 73/293 |
| 2,704,454 | 3/1955 | Martin ............................. 73/327 |
| 3,051,291 | 9/1962 | Landwer ........................... 73/293 |
| 3,263,553 | 8/1966 | Baruch .............................. 88/14 |
| 3,272,174 | 9/1966 | Pribonic ........................... 116/118 |
| 3,299,770 | 1/1967 | Witt et al. ........................ 88/14 |
| 3,367,184 | 2/1968 | McHugh ........................... 73/327 |
| 3,448,616 | 6/1969 | Wostl et al. ...................... 73/293 |
| 3,543,581 | 12/1970 | Ryder ............................. 73/327 |
| 3,553,666 | 1/1971 | Melone ........................... 340/244 |
| 3,589,191 | 6/1971 | Kelch, Jr. ......................... 73/327 |
| 3,683,196 | 8/1972 | Obenhaus .......................... 250/903 |
| 3,751,672 | 8/1973 | Michel et al. ..................... 250/218 |
| 3,766,395 | 10/1973 | Keir ............................... 250/214 R |
| 3,796,098 | 3/1974 | Trayer ............................. 73/327 |
| 3,818,470 | 6/1974 | Hirsbrunner et al. ............... 340/244 R |
| 3,834,235 | 9/1974 | Bouton et al. .................... 73/293 |
| 3,850,528 | 11/1974 | DeBellis .......................... 356/133 |
| 3,887,836 | 6/1975 | Leete .............................. 315/207 |
| 3,917,411 | 11/1975 | Schweizer et al. ................. 356/135 |
| 3,932,038 | 1/1976 | Schweizer et al. ................. 156/133 |
| 3,939,470 | 2/1976 | Arai et al. ....................... 340/59 |
| 3,977,790 | 8/1976 | Schweizer et al. ................. 356/136 |
| 3,995,169 | 11/1976 | Oddon ............................. 250/577 |
| 4,023,137 | 5/1977 | Olsbo et al. ...................... 340/59 |
| 4,037,967 | 7/1977 | Schweizer et al. ................. 356/135 |

(List continued on next page.)

FOREIGN PATENT DOCUMENTS

| | | |
|---|---|---|
| 65798 | 12/1982 | European Pat. Off. . |
| 2251210 | 10/1972 | Fed. Rep. of Germany . |
| 2726082 | 12/1978 | Fed. Rep. of Germany ........ 73/293 |
| 2920199 | 12/1979 | Fed. Rep. of Germany . |
| 2849066 | 5/1980 | Fed. Rep. of Germany . |
| 3021374 | 12/1981 | Fed. Rep. of Germany . |
| 3247198 | 7/1984 | Fed. Rep. of Germany ........ 73/293 |
| 126461 | 10/1975 | Japan . |
| 119260 | 10/1976 | Japan . |
| 14803 | 8/1983 | Japan . |
| 214715 | 12/1984 | Japan . |
| 89163 | 12/1987 | Japan . |
| 8903978 | 5/1989 | PCT Int'l Appl. . |
| 615995 | 2/1980 | Switzerland . |
| 412803 | 7/1934 | United Kingdom . |
| 87/01801 | 3/1987 | World Int. Prop. O. ........... 73/293 |

OTHER PUBLICATIONS

Aeroquip Product Information and Application News. TIN-2, Summer 1986, "Tedeco Levelmaster Electro-Optic Liquid Level Sensor", 2 pages.

Aeroquip Tedeco Division Bulletin TDB L250, "Tedeco Levelmaster 250 Series", 1987, 2 pages.

Primary Examiner—Thomas B. Will
Assistant Examiner—G. Bradley Bennett
Attorney, Agent, or Firm—Mitchell D. Bittman; H. Gibner Lehmann

[57] ABSTRACT

A liquid level monitor for sensing the level of liquid in a tank or vessel, typically an automobile radiator, employing a probe with a light emitting diode and phototransistor mounted inside an enclosure, the enclosure having a transparent lens through which light can pass, and the lens having a prism configuration which diffuses or alters stray light which occurs by reflection off an interior core wall of the vessel and prevents the diffused or dispersed light from rendering the phototransistor conductive and possibly leading to a false indication or reading of liquid level. The light emitting diode is electrically excited with a high-intensity, short duration pulse, which improves the sensitivity of the monitor.

20 Claims, 3 Drawing Sheets

U.S. PATENT DOCUMENTS

| | | | |
|---|---|---|---|
| 4,107,661 | 8/1978 | Crosby | 340/688 |
| 4,134,022 | 1/1979 | Jacobson | 250/577 |
| 4,155,013 | 5/1979 | Spiteri | 250/577 |
| 4,201,914 | 5/1980 | Perren | 250/577 |
| 4,242,590 | 12/1980 | von Tluck | 250/577 |
| 4,246,489 | 1/1981 | Yoshida et al. | 250/577 |
| 4,286,464 | 9/1981 | Tauber et al. | 73/293 |
| 4,306,805 | 12/1981 | Arrington | 356/133 |
| 4,320,291 | 3/1982 | Uramoto | 250/227 |
| 4,354,180 | 10/1982 | Harding | 340/619 |
| 4,440,022 | 4/1984 | Masom | 73/293 |
| 4,468,567 | 8/1984 | Sasano et al. | 250/577 |
| 4,503,419 | 5/1985 | Kidd et al. | 340/59 |
| 4,513,277 | 4/1985 | Moore et al. | 340/59 |
| 4,583,293 | 4/1986 | Smith | 33/126.4 |
| 4,631,529 | 12/1986 | Zeitz | 340/619 |
| 4,638,663 | 1/1987 | Seelhorst | 73/313 |
| 4,644,177 | 2/1987 | Barabino | 250/577 |
| 4,670,660 | 6/1987 | Kuhlen et al. | 250/577 |
| 4,684,417 | 8/1987 | Grandclement | 156/64 |
| 4,701,613 | 10/1987 | Watanabe et al. | 250/577 |
| 4,711,126 | 12/1987 | Houpt | 73/293 |
| 4,713,552 | 12/1987 | Denis et al. | 250/577 |
| 4,840,137 | 6/1989 | Beauvais et al. | 116/227 |
| 4,859,987 | 8/1989 | Markus | 340/450 |
| 4,979,797 | 12/1990 | Nemeth | 73/293 |
| 4,998,022 | 3/1991 | Tregay | 250/903 |
| 5,029,471 | 7/1991 | Goodrich | 73/293 |
| 5,159,834 | 11/1992 | Eisele | 250/577 |

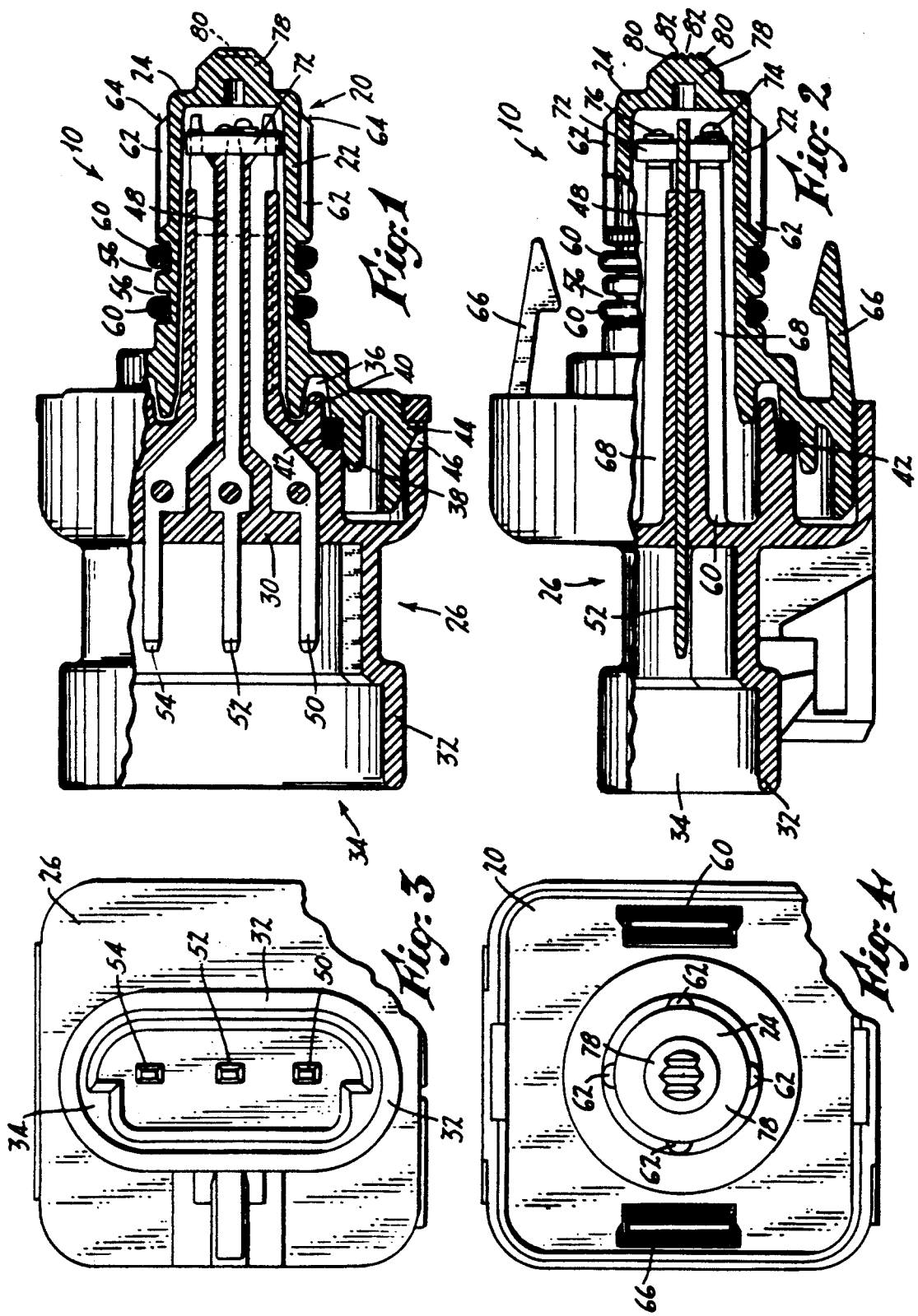

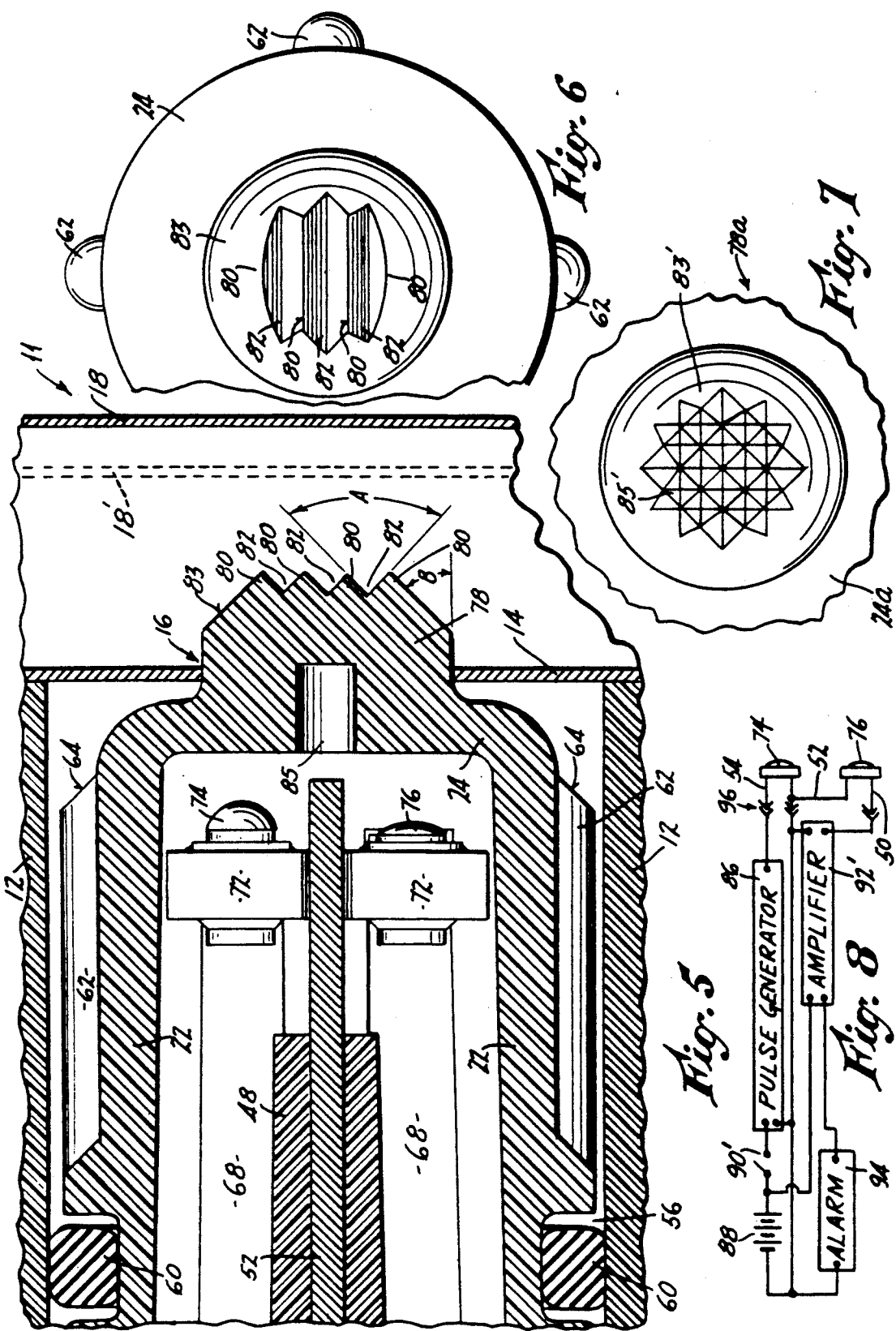

LIQUID LEVEL MONITOR

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to liquid level monitors, and more particularly to improvements in the monitoring apparati disclosed and claimed in U.S. Pat. Nos. 4,840,137 and 4,859,987. The first of these patents issued Jun. 20, 1989, is entitled LIQUID LEVEL GAUGING APPARATUS, and has common ownership with the present application. U.S. Pat. No. 4,859,987 issued Aug. 22, 1989, is entitled APPARATUS AND METHOD FOR MONITORING LIQUID LEVELS and also has common ownership with the present application. Accordingly, the entire disclosures of U.S. Pat. Nos. 4,840,137 and 4,859,987 are specifically incorporated by reference, into the present application.

2. Description of the Related Art Including Information Disclosed Under 37 CFR 1.97 and 37 CFR 1.98

In U.S. Pat. No. 4,840,137 above identified, the disclosed monitor employs a photocell and light emitting diode housed in a cup-like prism which has at its outer end a generally conical surface indicated by the reference numeral 102. This device was intended to be installed in the wall of the oil pan of an automotive vehicle. Its operation, as indicated in column 12, lines 31-36, is as follows: When the oil level in the pan is below a certain point on the cone 102, light from the light emitting diode is reflected internally of the cone and impinges upon the phototransistor, causing it to conduct. The resultant condition is employed to drive circuitry that provides the desired warning, namely to the effect that a low oil level exists in the pan.

However, when the oil level is normal, the cone 102 is covered and light impinging on the oil-cone interface is not sufficient, following reflection within the prism, to trigger the phototransistor.

While the disclosed arrangement has successfully been in use commercially for several years, attempts were made to extend the application of the apparatus to other equipment involving monitoring the level of various other liquids of the automobile.

The present invention constitutes an improvement by which the level of liquids other than crankcase oil can be monitored, as for example the coolant in the radiator of an automobile engine, heat exchanger, or other equipment.

An effort was made to adapt the monitor device of U.S. Pat. No. 4,840,137 for use with an automobile radiator. However, it was found that special conditions existed in radiators due to the heat exchanger core being closely jacketed at the reservoir area, which resulted in extremely confined spaces whereby under conditions of normal liquid levels and with liquids of a type which are generally more translucent than motor oil, substantial undesirable amounts of light were passing out through the surface of the cone 102, through the radiator liquid, striking a closely-located opposite internal surface of the radiator at the reservoir area, and then being reflected back to the cone in a manner to register on the phototransistor as an erroneous low level indication.

The reflective surface of the reservoir area in this case was within a fraction of an inch of the cone, typically less than one-quarter of an inch.

SUMMARY OF THE INVENTION

The problem set forth above in connection with the prior patented monitor sensor is obviated by the present invention, which has for one object the provision of a novel and improved gauge or monitor module for a liquid-containing vessel characterized by very confined internal spaces, which eliminates the undesired effect of stray light reflections from the internal surfaces in the vessel that lead to erroneous liquid level readings.

Yet another object of the invention is to provide an improved monitor or gauge as above set forth, which is not only simple in construction and reliable in operation but also economical to manufacture and produce, being largely fabricated from molded plastic components that interfit with one another.

Still another object of the invention is to provide an improved monitor gauge in accordance with the foregoing, which is rugged and resistant to damage resulting from impact, or from extremes of heat and cold.

A still further object of the invention is to provide an improved monitor or gauge as above characterized, which is resistant to inadvertent leaks, and capable of operation with hot, pressurized liquids of the type normally encountered in the radiator of an internal combustion engine.

In accomplishing the above objects the invention provides a monitor module, comprising a housing having a lens in one wall, the wall and lens being adapted for submersion in liquid whose level is to be monitored, a unique light emitting diode and a photo-responsive device in the housing, both facing in a common direction toward the lens, and a light-altering means which is cooperable with the lens, for attenuating predetermined portions of light originating from the light emitting diode and which might be externally reflected against the exterior of the lens from a point which is exterior to the the module's housing.

The light-altering means is sufficient to block the effects of stray light which is reflected from a closely juxtaposed inner surface such as a heat-exchanger core structure in the radiator or vessel and returned to the lens, while still not interfering with the normal functioning of the monitor in distinguishing between its lens being immersed in air or in the liquid being monitored.

In a preferred embodiment of the invention, the light emitting diode is driven with a high-intensity, short-duration electrical pulse which produces a momentary level of brightness that substantially exceeds the steady state light output normally obtainable with steady d. c. excitation, and the lens' outer surface is provided with a ribbed or textured configuration which has the desired effect of altering or diffusing undesired reflected light originally passing outwardly through the lens surface and entering the space beyond the lens, and which is then reflected off of an internal surface or a wall of the vessel with which the monitor module is being employed.

Other features and advantages will hereinafter appear.

BRIEF DESCRIPTION OF THE DRAWINGS

In the drawings, illustrating several embodiments of the invention:

FIG. 1 is a side view, partly in elevation and partly in axial section, of the improved liquid level monitor module of the invention.

FIG. 2 is a view like FIG. 1, taken at 90° to the showing of FIG. 1.

FIG. 3 is a fragmentary left end elevation of the monitor module of FIGS. 1 and 2.

FIG. 4 is a fragmentary right end elevation of the monitor module of FIGS. 1-3.

FIG. 5 is a fragmentary axial section, greatly enlarged, similar to FIG. 2 but rotated 180° therefrom, and in addition showing the monitor module mounted in the wall of a liquid-containing vessel such as an automotive vehicle's radiator, at the water-reservoir area thereof.

FIG. 6 is a fragmentary right end elevation, greatly enlarged, of the module of FIG. 5.

FIG. 7 is a fragmentary right end elevation, greatly enlarged, showing a modified lens, constituting a second embodiment of the invention.

FIG. 8 is a diagrammatic showing of the electrical circuit employing the light emitting diode and photo-responsive device as embodied in the monitor of the present invention.

DESCRIPTION OF THE PREFERRED EMBODIMENTS

Figure 9:
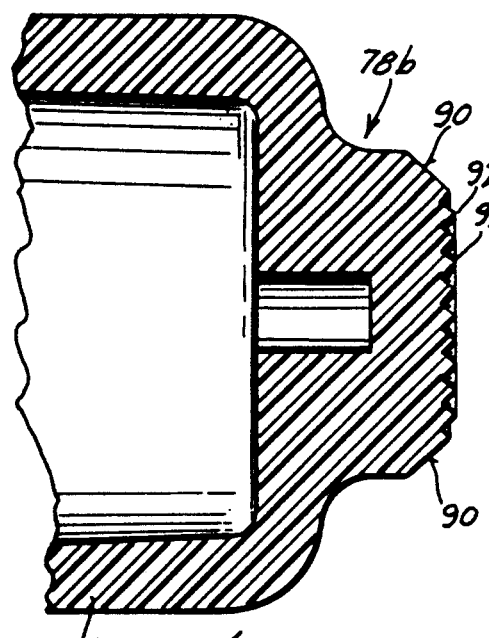
FIG. 9 is a fragmentary axial section of a further modified lens, constituting another embodiment of the invention.

Referring first to FIGS. 1, 2, 5 and 11, the liquid monitor of the present invention is in the form of a probe or module 10 which is adapted to be mounted in a vessel or radiator 11 (FIG. 5) by means of a tubular fitting 12 in the jacketing wall 14 of the radiator at the water reservoir area. The jacket or water reservoir wall 14 has an opening 16 which communicates with the interior of the fitting 12. To the right of the wall 14 is the radiator core wall 18 depicted in solid outline, this being the support for the core or heat-exchanger assemblage 19 (FIG. 11) which is disposed within the radiator 11. Depending on the particular make of the radiator, the wall 18 can be even closer, as for example in the position shown in dotted outline 18'.

The fitting 12 can be a separate piece, as shown, suitably attached as by welding to the radiator wall 14, or else it can be formed integrally with the wall, if desired, depending on the particular construction of the radiator.

Figure 11:
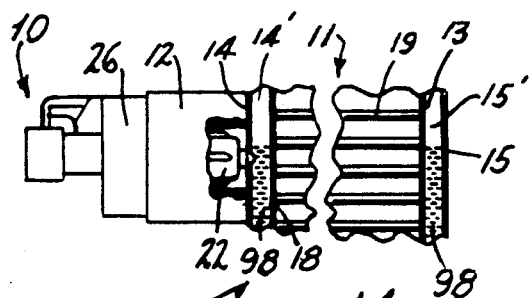
FIG. 11 is a diagram of the module mounted on a car radiator, specifically on the wall of the water reservoir or area and close to the core wall thereof.

FIG. 11 diagrammatically illustrates the radiator jacketing walls 14 and 15, and radiator core walls or heat-exchanger tube sheets 13 and 18, along with connecting tubes constituting the core assemblage 19. Between the walls 14 and 18 there is a coolant reservoir area 14', and between the walls 13 and 15 there is a similar coolant reservoir area 15'. The radiator coolant is indicated by the numeral 98 in FIG. 11.

The module 10 comprises a cup shaped enclosure 20 with an annular side wall 22 and a transverse end wall 24. The cup shaped enclosure 20 is telescopically received in a module housing designated 26, which has a terminal block 30 and an oval-shaped rigid skirt 32 defining an oval recess 34. The open end of the cup shaped enclosure 20 has an annular groove 36 surrounded by a projecting skirt 38, and the module housing 26 has a similar mating structure comprising an annular wall 40 which is received in the groove 36 of the cup-shaped enclosure 20. An O-ring 42 is disposed between the enclosure 20 and housing 26 and constitutes a compressible seat when the enclosure 20 and housing 26 are assembled.

On the outer surface of the cup shaped enclosure 20 are multiple retainer lugs 44, one such lug being shown in FIG. 1. The housing 26 also has multiple recesses 46, one of which is shown in FIG. 1, the recesses 46 being adapted to receive the lugs 44 respectively, and to retain the cup shaped enclosure 20 and housing 26 in assembled relation. The lugs 44 have sloped camming faces by which they can be slid past the lip of the housing 26 and seated in the recesses 46 as the enclosure 20 and housing 26 are telescoped into one another, compressing the O-ring 42 as in FIG. 1.

The terminal block 30 has an elongate axially-extending central projection or support 48, and three electrical terminals 50, 52 and 54 in the form of male terminal prongs having anchorage strips or bases are molded in place at the time the block 30 is formed. The terminals 50, 52 and 54 are elongate, and with the probe housing 26 assembled to the cup shaped enclosure 20, the anchorage strips having the terminals 50, 52 and 54 and the projection 48 extend a substantial distance into the enclosure 20 toward the transverse end wall 24 thereof.

Referring again to FIGS. 1 and 2, the enclosure 20 has two external annular grooves 56 which receive sealing O-rings 60 as shown. The O-rings 60 sealingly engage the inner surface of the fitting 12, FIG. 5, to prevent liquid in the radiator or vessel 11 from leaking out past the enclosure 20. Four positioning ribs 62 are provided on the outer surface of the enclosure 20, having tapered lead-in edge portions 64.

The enclosure 20 has integrally formed spring retainer fingers 66 with undercuts, which hold the assembled enclosure 20 and housing 26 in position on a mounting flange (not shown) of the fitting 12.

Disposed on opposite sides of the central projection 48 of the terminal block are support ribs 68, at the ends of which is mounted a printed circuit board 72. The terminals 50, 52 and 54 extend into holes in the printed circuit board and are soldered thereto.

There are provided on the printed circuit board 72, a light source such as a light emitting diode 74, preferably having an integral condensing lens, and a light sensor means, preferably a phototransistor 76, also shown with an integral condensing lens. The two ribs 68 and the terminals 50, 52 and 54 support the printed circuit board 72 as shown in FIGS. 1, 2 and 5, with the light emitting diode 74 and phototransistor 76 being disposed adjacent to and facing the transverse end wall 24 of the enclosure 20.

The end wall 24 comprises a lens formation 78 which operates to reflect either more or less light from the light emitting diode 74 to the phototransistor 76, according to whether or not the outer surface of the lens 78 is in contact with either air or liquid. When the outer surface of the lens 78 is immersed in air, sufficient light from the light emitting diode 74 is reflected internally of the lens 78 and strikes the phototransistor 76, causing it to conduct and, through suitable alarm circuitry shown in block diagram form in FIG. 8, be employed to indicate a low level of liquid.

On the other hand, when the outer surface of the lens 78 is immersed in liquid, the quantity of light reflected by the lens 78 to the phototransistor 76 is normally not sufficient to render the phototransistor conducting.

However, in the use of modules having a substantially conical lens configuration of the types illustrated in U.S. Pat. Nos. 4,840,137 and 4,859,987 noted above, it has been found that when such modules were used directly in the particular radiator installation corresponding to FIG. 5 of the present application, an erroneous low liquid level indication might often be shown. This was true especially where the radiator 11 had its internal core wall 18 somewhat shiny, as with some degree of light-reflecting properties, and where a generally translucent anti-freeze liquid 98 was being employed in the radiator, such as ethylene glycol anti-freeze solution. As presently understood the erroneous readings occurred because stray light that originated at the light emitting diode and passed outward through the lens and anti-freeze solution, struck the wall 18 and was reflected therefrom. Some of this reflected "stray" light re-entered the lens 78 and struck the phototransistor. The resultant conduction of the phototransistor corresponded to an erroneous low liquid level indication, and this false reading thus presented a problem with the prior patented constructions.

In accordance with the present invention there is provided on the outer surface of the lens 78, a prism structure which has the desired effect of dispersing or altering light which could be transmitted through it, thereby to reduce the undesirable effect of stray light reflections off of surfaces (such as the wall 18) within the radiator 11; this reduces the intensity of the reflected light which might reach the phototransistor 76.

In the embodiment of FIGS. 1-6, the prism structure takes the form of a plurality of substantially parallel ribs or ridges 80 separated by grooves 82 in the outer surface of the lens 78, the ribs 80 at their ends being a part of an original conical surface of the lens. FIGS. 5 and 6 show the construction in more detail. In particular, the periphery 83 of the lens is substantially conical; a series of three grooves 82 extends transversely of the axis of the enclosure 20. The angle between the walls of the grooves has been found to be of importance, lying preferably between 70° and 90°, with an optimal figure of 84° having been determined. This angle is indicated by the letter A in FIG. 5. The angle which the surface 83 makes with respect to the axis of the enclosure 20 is optionally 45°. This angle is indicated by the letter B in FIG. 5.

A center recess or blind hole 85 is preferably incorporated in the transverse end wall 24, to facilitate molding. The material out of which the cup shaped enclosure 20 and lens 78 is made can be polyethersulfone. The material of the module housing 26 is preferably a polyester-type plastic containing 15% glass.

Also in accordance with the invention and referring to FIG. 8, the light emitting diode 74 is excited with a high-intensity, short duration electrical pulse having an amplitude which exceeds the steady state current rating of the device, but which is present for a sufficiently short time so as not to damage the device. The intensity of the resultant light burst emitted by the light emitting diode 74 is significantly greater than that obtainable with steady state excitation thereof, and as presently understood is considered to contribute significantly to the relatively high sensitivity of the probe to even relatively minute changes in the quantity of light received by the phototransistor 76. In FIG. 8, the pulse is provided by a pulse generator 86 connected to the input of the light emitting diode 74. The vehicle's battery is designated 88, and the ignition switch designated 90'. The output of the phototransistor 76 is fed to an amplifier 92', which in turn drives an alarm or warning light 94 preferably located on the vehicle dashboard (not shown).

Also, in FIG. 8 the terminals 50, 52 and 54 are shown, and an electrical connector 96 provided to mate therewith, and to carry the proper signals between the light emitting diode 74, phototransistor 76, and the circuitry comprising the amplifier and pulse generator. The terminal 52 is seen to be common to both the light emitting diode 74 and the phototransistor 76. Details of specific electrical connections between the phototransistor 76, the amplifier 92' and alarm 94 of FIG. 8 are discussed in U.S. Pat. No. 4,859,987 identified above, and thus need not be repeated.

The light emitting diode 74 may, for example, be a GaAlAs (gallium aluminum arsenide) infrared light emitting diode of the type manufactured by Optek Technology, Inc. The phototransistor 76 may be, for example, an all NPN silicon phototransistor of the type also manufactured by Optek Technology, Inc.

As presently understood, light rays which have been emitted by the light emitting diode 74 and which pass outwardly through the forward end of the lens 78, are scattered to some extent as they enter the liquid in the radiator 11, i. e. the ethylene glycol 98, for example, (in the case of the outer surface of the lens 78 being submerged). Reflection of certain rays from the core wall surface 18, some of which would impinge on the lens 78 adjacent the phototransistor 76 are similarly scattered or diffused a second time, to the extent that the intensity of these "scattered, reflected" rays or beams, when received by the phototransistor 76 is attenuated and insufficient to render it conductive. Stated another way, the prismatic configuration on the exterior of the lens 78 disperses light reflected from the wall 18, preventing such reflected light from activating the phototransistor 76.

As a consequence, with the discovery made by the inventors, the phototransistor 76 does not substantially respond or go into conduction, when struck by stray light rays which are externally reflected off the core surface 18 and when the outer surface of the lens 78 is immersed in liquid. However, the phototransistor 76 does receive sufficient light to conduct when struck by rays that are internally reflected in the lens 78 when the outer surface of the lens is not immersed in liquid, corresponding to a low liquid condition.

Thus, by the invention the disclosed combination of a light emitting diode 74 excited by a short-duration, high-intensity electrical pulse, a phototransistor 76 and lens 78 having a prism formation 80, 82 enables the module to discriminate between: 1) light being mostly reflected within the lens 78, as a consequence of the outer surface of the lens 78 not being immersed; and 2) stray light which is reflected off the core wall 18 and through a translucent liquid 98 when such liquid is above the level of the lens 78, i. e. the outer surface of the lens is submerged in the translucent liquid. The light reflected from the wall 18 is considered to be the stray light, and the ability of the module to differentiate between the internally reflected light within the lens 78 and the reflected light from the core wall 18 is as presently understood, largely responsible for the success of the probe in providing true readings of liquid level in the radiator 11, without regard to the specific translucency of the liquid 98.

While the disclosed embodiments have been described as being applicable for use in an automobile radiator to monitor the level of coolant such as ethylene glycol, it can be readily understood that the device is applicable to other types of vessels and with other liquids of a translucent, or semi-translucent nature.

In FIG. 5 where the components are shown greatly enlarged, the distance between the jacket wall 14 of the reservoir area and the core support wall 18 can vary from 0.158 inch, down to 0.095 inch, the latter being represented by the wall 18' shown in dotted outline in FIG. 5. The above figures could be used with a lens having as a diameter, a figure of 0.22 inch, for example.

Yet another embodiment of the invention is shown in FIG. 7, wherein in place of the lens configuration of FIGS. 1-6, a modified lens 78a is illustrated, having a peripheral conical portion 83', and a series of pyramid-like prisms 85' disposed therebetween, side by side. The central or inner surface of the pyramids is generated by three grooves extending transversely of the cone 83' and an additional three grooves perpendicular to the first three grooves, also extending transversely of the cone axis. In such case, the radially outermost surfaces of the pyramids are constituted as sections of a conical surface having the same curvature as that of the cone 83'. The surfaces of the innermost pyramids are mostly planar, being constituted as plane sections which lie within the planar walls of the transverse grooves.

The lens configuration illustrated in FIG. 7 has been found to be adaptable to the module of FIGS. 1-6, and to provide a similar desired "light scattering" characteristic which enables the probe to discriminate between reflected light within the lens itself, and stray reflected light. In particular, the stray light is that which has passed through the translucent liquid in which the outer surface of the lens is immersed, and has been reflected off the core surface 18 and re-enters the lens 78a, to strike the phototransistor 76.

Figure 10:
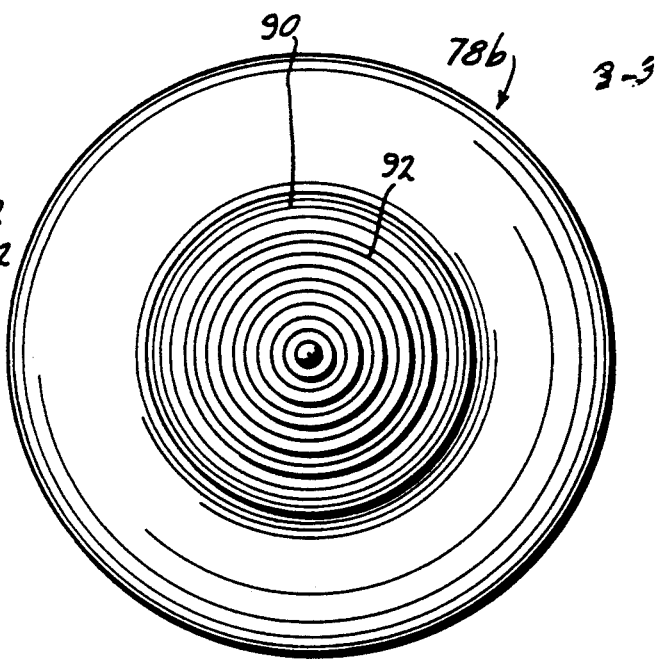
FIG. 10 is a right end elevation of the lens of FIG. 9.

Still another embodiment of the invention is shown in FIGS. 9 and 10, which illustrate a further modified lens configuration 78b on a cup shaped enclosure 20b, the lens configuration comprising a substantially conical peripheral outer ring portion 90, and a series of concentric, circular ridges 92 separated from one another by grooves. In this construction, an advantageous symmetry is realizeable, and there is thus eliminated any reliance on the relative positioning between the light emitting diode 74, phototransistor 76, and grooves such as those indicated between the ribs 80 in FIGS. 5 and 6. Again, with the construction of FIGS. 9 and 10, the lens configuration provides the desired "light scattering" characteristics which enable the probe to discriminate or differentiate between: 1) reflected light within the lens 78b itself; and 2) stray reflected light that has exited the lens 78b, passed through translucent liquid 98 in which the outer surface of the lens 78b is immersed and been reflected off the wall 18 to re-enter the lens 78b and strike the phototransistor 76.

It has been determined that an optimal angle for the surface 90 with respect to the axis of the lens 78b is 45°. An optimal angle between the walls of the grooves between the ribs 92 is typically 84°, with a radial spacing between the ribs of 0.017 inch, and a groove depth of 0.008-0.011 inch, measured from the plane containing the peaks of the ribs. FIG. 9 is presented roughly at a scale of 10:1, with respect to an actual lens construction.

In practice, the conical faces of the circular grooves between the ribs 92 need not be polished smooth. A matte finish has been found to provide acceptable results, possibly for the reason that the light scattering or dispersing effect of the ribs is somewhat enhanced with such a non-smooth finish.

From the above it can be seen that we have provided a novel and improved liquid level monitor which effectively eliminates the undesired effects of stray light reflections from internal surfaces in the vessel, which reflections were found to seriously adversely affect the operability of the patented devices.

The solution to the problem involving stray reflected light, as discovered by applicants, is seen to be simple and straightforward, and capable of implementation without the need for complex physical barrier structures in the tank, or alternately extensive electrical processing of the phototransistor-derived signals in order to accomplish the desired discrimination function.

As presently understood, the monitor is adaptable to virtually any tank structure and capable of operation with a variety of liquids, whether translucent, opaque, or having light transmitting characteristics falling somewhere between these limits.

The disclosed solution as set forth by applicants is thus seen to represent a distinct advance and improvement in the field of liquid level indicators.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:
1. A liquid level monitor, comprising in combination:
  a) a housing having a lens in one wall, said wall and lens being adapted for submersion in liquid whose level is to be monitored,
  b) a light emitting diode and a photo-responsive device in said housing, both facing in a common direction toward said lens, and
  c) light-passing and altering means located on the exterior of said lens, said means being cooperable with said lens for attenuating predetermined portions of reflected stray light which have originated at the light emitting diode and which have passed outwardly through the lens, and which have been externally reflected onto the exterior of the lens from a point which is spaced from the lens and which is exterior to the said housing.

2. The invention as set forth in claim 1, wherein:
  a) said light-passing and altering means comprises prism configurations on the outer surface of said lens.

3. The invention as set forth in claim 2, wherein said prism configurations comprise a series of substantially parallel ribs.

4. The invention as set forth in claim 2, wherein said prism configurations comprise a series of pyramids, spaced side by side.

5. The invention as set forth in claim 3, wherein the ribs have troughs between them, and the angle between the walls of each trough is between 72° and 90°.

6. The invention as set forth in claim 3, wherein the ribs have troughs between them, and the angle between the walls of each trough is on the order of 84°.

7. The invention as set forth in claim 1, wherein the lens has a conical exterior surface configuration, and the light-passing and altering means is disposed in the conical surface of the lens.

8. The invention as set forth in claim 7, wherein the lens has a center recess at its inner side opposite to the conical surface thereof.

9. The invention as set forth in claim 1, and further including a reflecting surface disposed opposite the lens, and spaced a distance therefrom.

10. The invention as set forth in claim 9, wherein said reflecting surface comprises a core wall of an automotive radiator.

11. The invention as set forth in claim 10, wherein said liquid comprises a translucent radiator coolant.

12. The invention as, set forth in claim 1, wherein:
a) said light-passing and altering means comprises multiple pyramids, spaced side by side, on the outer surface of said lens.

13. The invention as set forth in claim 1, wherein:
a) said light-passing and altering means comprises multiple prisms, formed by a set of substantially parallel ridges and grooves, and a second set of substantially parallel ridges and grooves, said second set being substantially perpendicular to the first-mentioned set of ridges and grooves, respectively.

14. The invention as set forth in claim 1, wherein:
a) said light-passing and altering means comprises a peripheral conical surface, and a series of circular ridges within said conical surface, said ridges being substantially concentric with one another, and being separated from one another by circular grooves.

15. The invention as set forth in claim 14, wherein the walls of the circular grooves have a matte finish.

16. The invention as set forth in claim 1, and further including:
a) an automotive vehicle radiator having a heat-exchanger core and a jacketing wall exterior to said core in closely spaced relation thereto,
b) said core having a reflective tube sheet defining with said jacketing wall a coolant reservoir area,
c) said housing being mounted on said jacketing wall and with its lens facing said tube sheet.

17. A liquid level monitor for a tank or vessel, said tank having an aperture in a side wall, and containing a generally translucent liquid, and said tank having a core with a light-reflective interval wall surface, the monitor comprising in combination:
a) a liquid level indicator probe comprising a housing carried in the aperture of said tank side wall, said indicator probe having walls and a lens in one of its walls, said lens being adapted for submersion in the liquid in the tank,
b) a light emitting diode and a photo-responsive device in said probe housing, both facing in a common direction toward said lens, and
c) light-altering means which is cooperable with said lens, for attenuating predetermined portions of light which originate from the light emitting diode, pass through the translucent liquid, impinge on said light-reflective internal wall surface of the core and are reflected back therefrom, through the lens and to the photo-responsive device, and which could otherwise cause erroneous readings of the liquid level.

18. A liquid level monitor for a tank or vessel, said tank having an aperture in a side wall, and containing a generally translucent liquid, said tank having an internal core with a light-reflective internal wall surface, the monitor comprising in combination:
a) a liquid level indicator probe comprising a housing carried in the aperture of said tank side wall, said indicator probe having walls and a lens in one of its walls, said lens being adapted for submersion in the liquid in the tank,
b) a light emitting diode and a photo-responsive device in said probe housing, both facing in a common direction toward said lens, and
c) means on said lens, for discriminating between light that is generated by the light emitting diode and internally reflected by the lens to arrive at the photo-responsive device, and stray light that is generated by the light emitting diode, passes outwardly through the lens and translucent liquid, impinges on and is reflected from the light-reflective internal wall of the tank to re-enter the lens and strike the photo-responsive device, thereby to prevent an erroneous low reading of liquid level due to such stray light.

19. An automotive radiator and coolant level monitor therefor, comprising in combination:
a) a radiator tank having an apertured side wall, and containing a generally translucent coolant liquid,
b) a light-reflective internal wall surface disposed in said radiator tank,
c) a coolant level indicator probe comprising a housing carried in the aperture of said radiator tank side wall, said indicator probe having walls and a lens in one of its walls, said lens being adapted for submersion in the coolant liquid in the tank,
d) a light emitting diode and a photo-responsive device in said probe housing, both facing in a common direction toward said lens, and
e) light-altering means which is cooperable with said lens, for attenuating predetermined portions of light which originate from the light emitting diode, pass through the coolant, impinge on said light-reflective internal wall surface of the radiator tank and are reflected back therefrom, through the lens and to the photo-responsive device, and which could otherwise cause erroneous readings of the coolant level.

20. An automotive radiator and coolant level monitor therefor, comprising in combination:
a) a radiator tank having an apertured side wall, and containing a generally translucent coolant liquid,
b) a light-reflective internal wall disposed in said radiator tank,
c) a coolant level indicator probe comprising a housing carried in the aperture of said radiator tank side wall, said indicator probe having walls and a lens in one of its walls, said lens being adapted for submersion in the coolant liquid in the tank,
d) a light emitting diode and a photo-responsive device in said probe housing, both facing in a common direction toward said lens, and
e) means on said lens, for discriminating between light that is generated by the light emitting diode and internally refracted by the lens to the photo-responsive device, and stray light that is generated by the light emitting diode, passes outwardly through the lens and coolant and is reflected from the light-reflective internal wall of the radiator tank, and which thereafter re-enters the lens as a dispersed beam and strikes the photo-responsive device, thereby to prevent an erroneous reading of coolant level due to such stray light.

* * * * *